UNITED STATES PATENT OFFICE.

EMIL WOLF, OF UJPEST, AUSTRIA-HUNGARY, ASSIGNOR TO CHINOIN GYÓGYSZER ÉS VEGYÉSZETI TERMÉKEK GYÁRA R. T. /DR. KERESZTY ÉS DR. WOLF/, OF UJPEST, AUSTRIA-HUNGARY, A CORPORATION OF HUNGARY.

PROCESS FOR THE MANUFACTURE OF ALIPHATIC ALKYL SULFATES.

1,101,373. Specification of Letters Patent. Patented June 23, 1914.

No Drawing. Application filed December 8, 1913. Serial No. 805,366.

*To all whom it may concern:*

Be it known that I, EMIL WOLF, Ph. D., a subject of the King of Hungary, residing at Ujpest, Austria-Hungary, have invented a new and useful Improvement in Processes for the Manufacture of Aliphatic Alkyl Sulfates; and I do hereby declare the following to be a full, clear, and exact description of the same.

The processes hitherto known for the manufacture of diethyl-sulfate are based either on previous formation and subsequent distillation of ethyl sulfuric acid or on the vacuum distillation of ethyl sulfates. Both processes require expensive apparatus.

It has been found that aliphatic alkyl sulfates can be produced with extraordinary simplicity by causing sulfuric acid chlorhydrin to act on the corresponding aliphatic ether. Sulfuric acid chlorhydrin converts in the cold aliphatic ethers on the one hand into alkyl sulfuric acid chlorids, and on the other hand into alcohols which, on being heated, give off hydrochloric acid and combine to form the corresponding alkyl sulfate in accordance with the following equations:

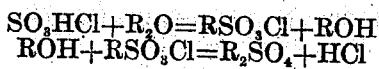

$$SO_3HCl + R_2O = RSO_3Cl + ROH$$
$$ROH + RSO_3Cl = R_2SO_4 + HCl$$

in which R is an alkyl radical. The correctness of the equations is proved by the fact that by interrupting the reaction after the mixing of the ether with the sulfuric acid chlorhydrin, pouring out the mixture on ice and quickly separating the oil separated from water and distilling in a vacuum, the intermediate alkyl sulfuric acid chlorid can be obtained separately.

The process could be carried out in an extraordinarily simple manner, unlike the usual processes.

The process can be used both for the manufacture of symmetrical alkyl sulfates, with exception of dimethyl sulfate, and also for the manufacture of alkyl sulfates containing different or substituted alkyl radicals. The products are used as alkylizing means in chemical synthesis.

First example: 30 kg. of ethyl ether are cooled in a lead vessel to 2° centigrade and mixed successively with strong stirring with 45 kg. of sulfuric acid chlorhydrin, care being taken to avoid an essential increase of temperature. When the supply is finished, the whole is heated on a reflux cooler until the generation of hydrochloric acid ceases, the product is poured on ice, absorbed by a neutral solvent such as for instance carbon tetrachlorid, washed with a little of very diluted solution of soda, dried and after separating the solvent, distilled in a vacuum. The diethyl sulfate thus obtained is distinguished by great purity.

Second example: 1 mol. of chlorin methyl ether ($CH_2Cl,OCH_3$) is cooled to $-5°$ and after addition of 1 mol. sulfuric acid chlorhydrin treated as in the previous example. The product produced is identical with the chlorin-methyl methyl sulfate obtained by Houben by another process.

Third example: Methyl propyl ether is treated in accordance with the above examples with sulfuric acid chlorhydrin. A methyl propyl sulfate hitherto unknown and boiling at 7 mm. pressure at 125°, is obtained in accordance with the above equations and in a good yield.

What I claim and desire to secure by Letters Patent is:

1. A process for the production of aliphatic alkyl sulfates, which comprises subjecting the corresponding aliphatic ether to the action of sulfuric acid chlorhydrin.

2. A process for the production of aliphatic alkyl sulfates, which comprises mixing the correspondi aliphatic ether at a low temperature with sulfuric acid chlorhydrin, heating the mixture till the generation of hydrochloric acid ceases and separating the sulfate.

3. A process for the production of subtituted aliphatic alkyl sulfates, which comprises subjecting the corresponding substituted aliphatic ether to the action of sulfuric acid chlorhydrin.

4. A process for the production of aliphatic alkyl sulfates, containing different alkyl rests, which comprises subjecting the corresponding aliphatic ether, containing different alkyl radicals, to the action of sulfuric acid chlorhydrin.

In testimony whereof, I have signed my name to this specification in the presence of two subscribing witnesses.

DR. EMIL WOLF.

Witnesses:
CHARLES MEDIQYES,
JOHN J. RONTO.